and an A/D converter. The attenuator generates a second analog signal by voltage-dividing a first analog signal by two resistors. The analog processor generates a third analog signal by amplifying the second analog signal with a predetermined gain. The A/D converter converts the third analog signal into a digital signal. A voltage-dividing ratio of the attenuator is not higher than a ratio of a maximum value of the amplitude of a signal inputtable to the analog processor to a maximum value of the amplitude of a signal having a possibility of being output from the image sensor.

(12) United States Patent
Takahashi

(10) Patent No.: US 8,854,704 B2
(45) Date of Patent: Oct. 7, 2014

(54) IMAGE READING APPARATUS AND IMAGE FORMING APPARATUS

(71) Applicant: KYOCERA Document Solutions Inc., Osaka (JP)

(72) Inventor: Masayoshi Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/950,007

(22) Filed: Jul. 24, 2013

(65) Prior Publication Data
US 2014/0029068 A1   Jan. 30, 2014

(30) Foreign Application Priority Data

Jul. 27, 2012  (JP) ................. 2012-167409

(51) Int. Cl.
  *H04N 1/04* (2006.01)
  *H04N 1/46* (2006.01)
  *H04N 1/40* (2006.01)
  *H04N 1/00* (2006.01)

(52) U.S. Cl.
  CPC ....... *H04N 1/40068* (2013.01); *H04N 1/40056* (2013.01); *H04N 1/00827* (2013.01)
  USPC ........... 358/483; 358/497; 358/474; 358/514; 358/482; 358/513; 358/475; 358/461; 358/471; 358/501; 358/447

(58) Field of Classification Search
  USPC ......... 358/483, 497, 474, 514, 482, 513, 475, 358/461, 471, 501, 447
  See application file for complete search history.

(56) References Cited

U.S. PATENT DOCUMENTS

| 5,478,997 | A  | * | 12/1995 | Bridgelall et al. | ........ | 235/462.25 |
| 7,327,500 | B2 | * | 2/2008 | Sakakibara et al. | .......... | 358/483 |
| 2004/0184116 | A1 | * | 9/2004 | Sakakibara et al. | .......... | 358/483 |
| 2004/0189814 | A1 | * | 9/2004 | Katoh et al. | ............... | 348/208.1 |
| 2006/0098242 | A1 | * | 5/2006 | Chang | ........................... | 358/474 |

FOREIGN PATENT DOCUMENTS

| JP | 2001-257836 | 9/2001 |
| JP | 2006-270901 | 10/2006 |

OTHER PUBLICATIONS

Japanese Office Action—Jul. 29, 2014.

\* cited by examiner

*Primary Examiner* — Charlotte M Baker
*Assistant Examiner* — Rury Grisham
(74) *Attorney, Agent, or Firm* — Gerald E. Hespos; Michael J. Porco; Matthew T. Hespos

(57) ABSTRACT

An image reading apparatus includes a light source unit, an image sensor, an attenuator, an analog processor and an A/D converter. The attenuator generates a second analog signal by voltage-dividing a first analog signal by two resistors. The analog processor generates a third analog signal by amplifying the second analog signal with a predetermined gain. The A/D converter converts the third analog signal into a digital signal. A voltage-dividing ratio of the attenuator is not higher than a ratio of a maximum value of the amplitude of a signal inputtable to the analog processor to a maximum value of the amplitude of a signal having a possibility of being output from the image sensor.

6 Claims, 8 Drawing Sheets

… (1)

IMAGE READING APPARATUS AND IMAGE FORMING APPARATUS

INCORPORATION BY REFERENCE

This application is based on Japanese Patent Application Serial No. 2012-167409 filed with the Japan Patent Office on Jul. 27, 2012, the contents of which are hereby incorporated by reference.

BACKGROUND

The present disclosure relates to an image reading apparatus and an image forming apparatus provided with the image reading apparatus and particularly relates to a technique for limiting a voltage level of an analog signal output from an image sensor.

Conventionally, a reading process for generating image data of a document facing a reading position has been performed in an image reading apparatus. In this reading process, a light source irradiates a beam of light (dotted line in FIG. 7) to a surface of a document placed on a contact glass and the beam of light is reflected, for example, as shown in FIG. 7. A part of reflected light (solid line in FIG. 7) is introduced to an image sensor such as a CCD via reflecting mirrors and a condenser lens. The image sensor converts the received light into an analog signal indicating the intensity of the received light by a voltage. The image reading apparatus repeatedly performs the above series of the reading process while moving the light source in a sub scanning direction or conveying a document in the sub scanning direction by an ADF (Auto Document Feeder). In this way, the image reading apparatus forms image data corresponding to the entire document and completes the reading of the document.

However, for example, as shown in FIG. 8, in the case of reading a glossy three-dimensional object such as a precious metal or a credit card as a document, light irradiated from a light source may be specularly reflected (specular reflection) by a document surface and the specularly reflected light may enter an image sensor such as because the glossy surface to be read is partly curved. This specularly reflected light may come to have intensity several times higher as compared with in the case of reading documents having a normal flat surface. This may cause a voltage level of an analog signal output from the image sensor to become several times higher than in normal times.

An AFE (Analog-Front-End) circuit is provided in a stage subsequent to the image sensor. The AFE circuit samples and amplifies the analog signal output from the image sensor on a pixel-to-pixel basis. A dynamic range of the input of the AFE circuit has become smaller with a tendency of recent years that a power-supply voltage of a circuit system decreases. Thus, if an analog signal having a high voltage level corresponding to specularly reflected light is input to the AFE circuit, a problem that the AFE circuit may erroneously operate to cause a defect in a read image.

To solve this problem, a technique for providing a clamp circuit and a limiter circuit between an image sensor and an AFE circuit has been proposed. The clamp circuit sets a black level (upper limit value) of an image signal output from the image sensor at such a level as not to exceed a limit value of the black level of the AFE circuit. The limiter circuit limits the level of the image signal output from the clamp circuit after the black level is set to such a level as not to exceed a limit value (lower limit value) of a white level of the input of the AFE circuit. By this, in the above technique, the level of the signal to be input to the AFE circuit can be limited within the dynamic range of the input of the AFE circuit.

SUMMARY

An image reading apparatus according to the present disclosure includes a light source unit, an image sensor, an attenuator, an analog processor and an A/D converter. The light source unit irradiates light to a document. The image sensor receives reflected light from the document irradiated with light by the light source unit and outputs a first analog signal representing the intensity of the reflected light by a voltage. The attenuator includes an input portion to which the first analog signal is input, a first resistor, one end of which is connected to the input portion and a second resistor, one end of which is connected to the other end of the first resistor and the other end of which is grounded. The attenuator generates a second analog signal by voltage-dividing the first analog signal at a predetermined voltage-dividing ratio by the first and second resistors. The analog processor generates a third analog signal by amplifying the second analog signal with a predetermined gain. The A/D converter converts the third analog signal into a digital signal. The voltage-dividing ratio is not higher than a ratio of a maximum value of the amplitude of an analog signal inputtable to the analog processor to a maximum value of the amplitude of an analog signal having a possibility of being output from the image sensor.

These and other objects, features and advantages of the present disclosure will become more apparent upon reading the following detailed description along with the accompanying drawings.

DETAILED DESCRIPTION

Figure 1:
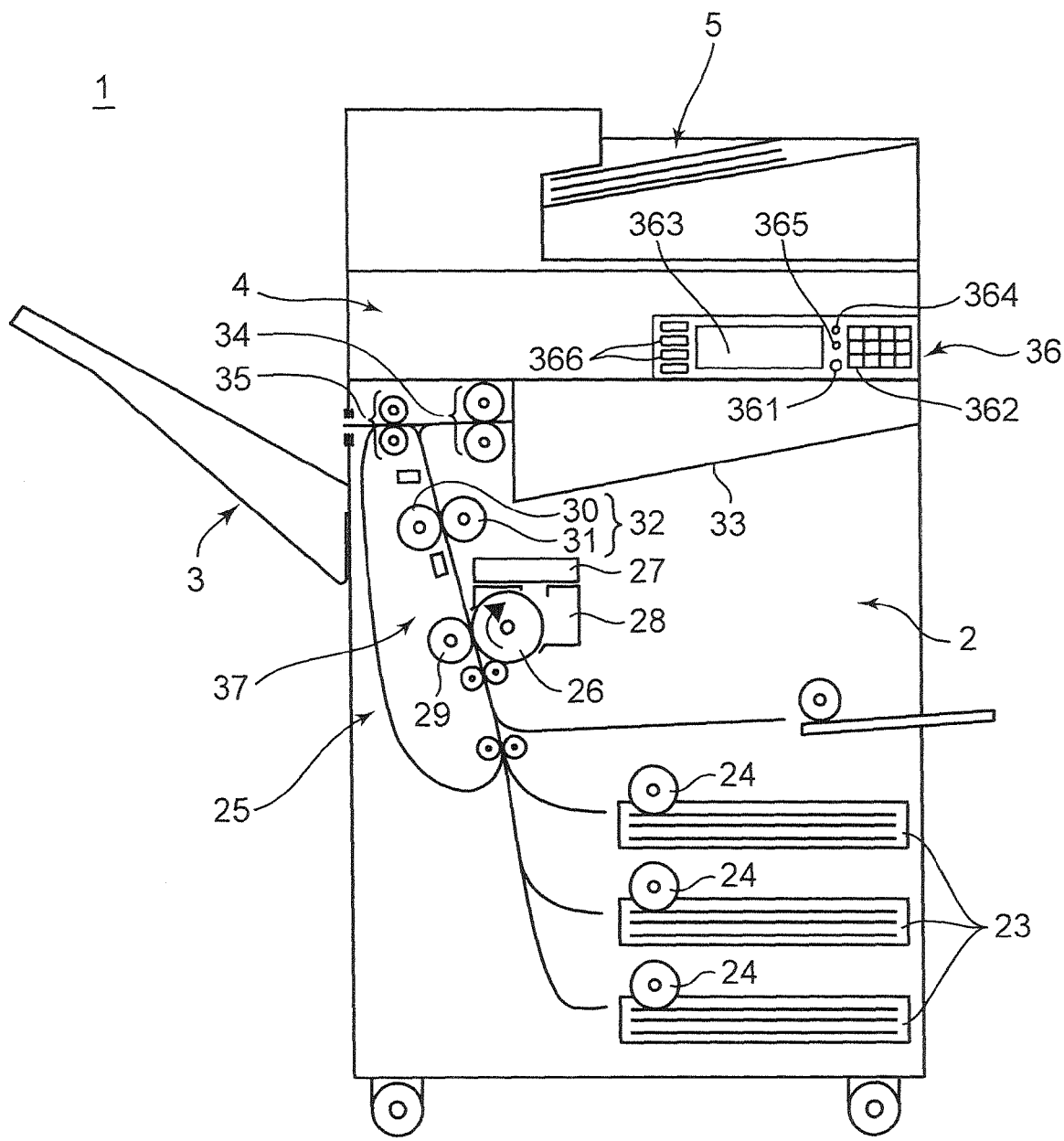
FIG. 1 is a schematic configuration diagram of a multifunctional peripheral according to one embodiment of an image forming apparatus according to the present disclosure.

Hereinafter, an embodiment according to the present disclosure is described based on the drawings. FIG. 1 is a schematic configuration diagram of a multifunctional peripheral according to one embodiment of an image forming apparatus according to the present disclosure.

A multifunctional peripheral 1 includes a plurality of functions such as a copy function, a printer function, a scanner function and a facsimile function. As shown in FIG. 1, the multifunctional peripheral 1 includes a main unit 2, a stack tray 3 provided to the left of the main unit 2, an operation unit 36 used by a user to enter various operation commands and the like, an image reading apparatus 4 arranged atop the main unit 2 and a document feeding unit 5 arranged atop the image reading apparatus 4.

The main unit 2 includes a plurality of sheet cassettes 23, feed rollers 24 for picking up recording sheets one by one from the sheet cassettes 23 and conveying them to an image forming unit 25 and the image forming unit 25 for forming images on recording sheets conveyed from the sheet cassettes 23.

The image forming unit 25 includes an optical unit 27, a developing unit 28, a transfer unit 29, a fixing device 32 and conveyor roller pairs 34, 35. The optical unit 27 outputs laser light or the like based on image data obtained, for example, by the image reading apparatus 4 to be described later and exposes a photoconductive drum 26 to light. The developing unit 28 forms a toner image on the photoconductive drum 26. The transfer unit 29 transfers a toner image on the photoconductive drum 26 to a recording sheet. The fixing device 32 is composed of a pair of rollers 30, 31 for heating a recording sheet having a toner image transferred thereto and fixing the toner image to the recording sheet. The conveyor roller pairs 34, 35 are provided at intermediate positions of a sheet conveyance path in the image forming unit 25 and conveys a recording sheet to the stack tray 3 or a discharge tray 33.

The operation unit 36 includes a start key 361 used by the user to enter execution instructions of various functions provided in the multifunctional peripheral 1, a numerical keypad 362 for entering the number of print copies and the like, and a display unit 363 for displaying various pieces of information such as a liquid crystal display having a touch panel function. Further, the operation unit 36 includes a reset key 364 for resetting set contents and the like, a stop key 365 for stopping a printing (image forming) operation being executed, and function switch keys 366 for switching the copy function, the printer function, the scanner function and the facsimile function from one to another.

Figure 2:
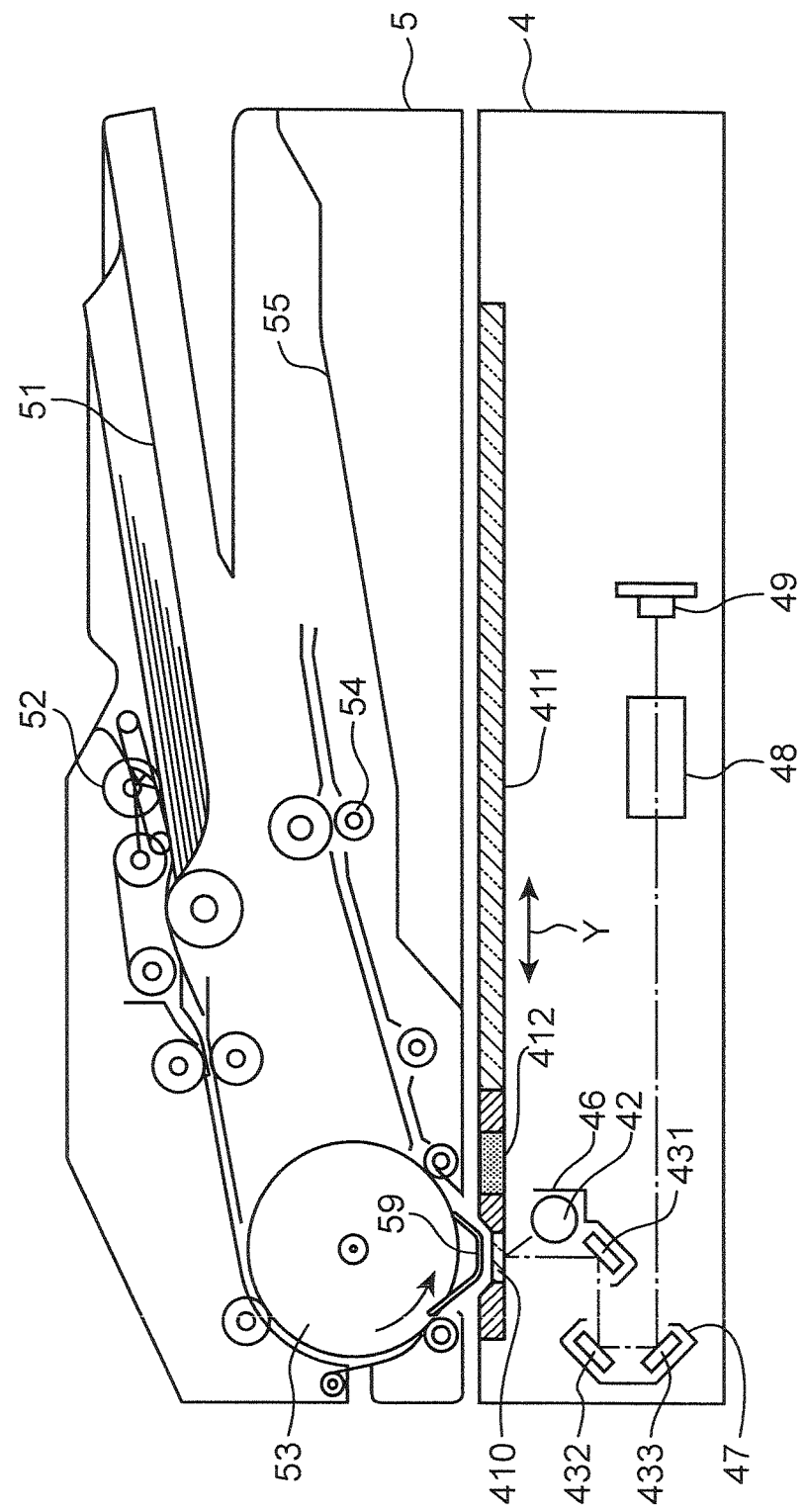
FIG. 2 is a schematic configuration diagram of a document feeding unit and an image reading apparatus.

FIG. 2 is a schematic configuration diagram of the document feeding unit 5 and the image reading apparatus 4. As shown in FIG. 2, the document feeding unit 5 includes a document tray 51, a feed roller 52, a conveyor drum 53, a discharge roller 54 and a discharge tray 55 and configures an ADF (Auto Document Feeder). That is, the feed roller 52 picks up documents placed on the document tray 51 one by one and conveys them to the conveyor drum 53. The discharge roller 54 discharges the documents conveyed by way of the conveyor drum 53 to the discharge tray 55.

The image reading apparatus 4 optically obtains an image of a document and outputs an image signal. For example, as shown in FIG. 2, the image reading apparatus 4 includes a contact glass 411, a light source (light source unit) 42, a first mirror 431, a second mirror 432, a third mirror 433, a first carriage 46, a second carriage 47, a condenser lens 48 and a CCD (Charge Coupled Device) (image sensor) 49.

On the contact glass 411, a document to be read is to be placed. The light source 42 and the first mirror 431 are supported by the first carriage 46. The second mirror 432 and the third mirror 433 are supported by the second carriage 47.

The image reading apparatus 4 can read a document in two types of modes (methods): a flat-bed reading mode of reading a document placed on the contact glass 411 and an ADF reading mode of causing the document feeding unit 5 to convey a document and reading the document during conveyance.

In the flat-bed reading mode, the light source 42 irradiates light toward one line (reading target line) extending in a main scanning direction of an object to be read on a document placed on the contact glass 411. Reflected light from the reading target line is reflected by the first, second and third mirrors 431, 432 and 433 and enters the condenser lens 48. The light incident on the condenser lens 48 is condensed and emitted to the CCD 49. The CCD 49 photoelectrically converts the received light.

The CCD 49 is a linear image sensor. The CCD 49 simultaneously processes an image of one line of the document and outputs an analog signal indicating the intensity of the received light by a voltage. In this way, the reading of an image of one line of the document in the flat-bed reading mode is completed. Then, the image reading apparatus 4 moves the first and second carriages 46, 47 in a direction (sub scanning direction, direction of an arrow Y) perpendicular to the main scanning direction (direction perpendicular to the plane of FIG. 2) of the document and reads an image of the next line of the document.

On the other hand, in the ADF reading mode, the feed roller 52 picks up documents placed on the document tray 51 one by one. Then, when the document passes through a clearance between a reading window 410 and a guide plate 59 provided on a conveyance path between the conveyor drum 53 and the discharge tray 55, the light source 42 irradiates light to a reading target line of the document via the reading window 410. Reflected light from the reading target line is reflected by the first, second and third mirrors 431, 432 and 433 and incident on the condenser lens 48. The light incident on the condenser lens 48 is condensed and emitted to the CCD 49. The CCD 49 photoelectrically converts the received light. In this way, the reading of one line in the ADF reading mode is completed. Then, when the document is conveyed in the sub scanning direction by the document feeding unit 5, the image reading apparatus 4 reads an image of the next line of the document.

Figure 3:
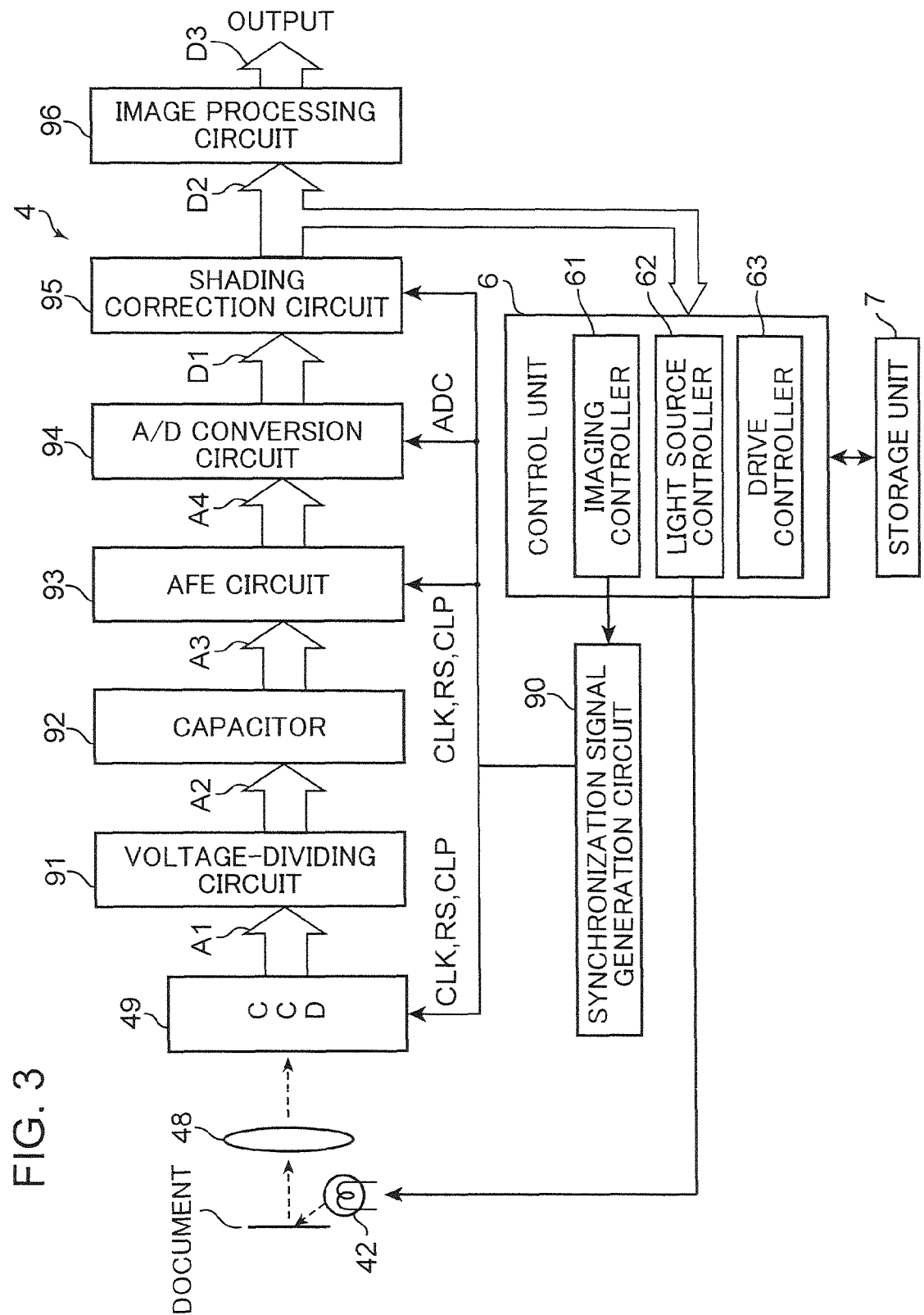
FIG. 3 is a block diagram showing the electrical configuration of the image reading apparatus.

Next, the electrical configuration of the image reading apparatus 4 is described. FIG. 3 is a block diagram showing the electrical configuration of the image reading apparatus 4.

As shown in FIG. 3, the image reading apparatus 4 includes the light source 42, the condenser lens 48, the CCD 49, a control unit 6, a storage unit 7, a synchronization signal generation circuit 90, a voltage-dividing circuit (attenuator) 91, a capacitor 92, an AFE circuit (analog processor) 93, an A/D conversion circuit (A/D converter) 94, a shading correction circuit 95 and an image processing circuit 96. Components denoted by the same reference signs as in FIGS. 1 and 2 are not described below unless otherwise particularly noted.

The control unit 6 includes, for example, a CPU (Central Processing Unit) for performing predetermined arithmetic processings, memories such as a ROM (Read Only Memory) storing a predetermined control program and a RAM (Random Access Memory) for temporarily storing data, peripheral circuits of these and the like.

The control unit 6 performs various processings by executing the control program stored in the ROM or the like by the CPU, thereby controlling the operation of the entire multifunctional peripheral 1. The control unit 6 is configured as processors for executing a plurality of functions. Particularly, the controller 6 includes an imaging controller 61, a light source controller 62 and a drive controller 63 as processors for executing functions relating to the image reading apparatus 4.

The imaging controller 61 controls the operation of a circuit of an imaging system composed of the CCD 49, the AFE circuit 93, the A/D conversion circuit 94, the shading correction circuit 95 and the like. The imaging controller 61 sends an instruction to send various timing signals to be described later to the synchronization signal generation circuit 90.

The light source controller 62 on/off controls light irradiation by the light source 42. Further, the light source controller 62 controls the quantity of light to be irradiated from the light source 42.

The drive controller 63 controls drive motors (not shown) for the first and second carriages 46, 47 to move the first and second carriages 46, 47 in the sub scanning direction in the flat-bed reading mode. Further, the drive controller 63 controls the conveyance of a document by the document feeding unit 5 in the ADF reading mode.

The storage unit 7 is configured using a nonvolatile storage element such as an EEPROM (Electrically Erasable and Programmable Read Only Memory). Various set values used for control such as various correction values used for shading correction in the shading correction circuit 95 are, for example, stored in the storage unit 7.

The synchronization signal generation circuit 90 generates and outputs timing signals necessary for timing controls of a series of operations by the circuit of the imaging system such as periodic signals for operating the CCD 49 and the AFE circuit 93 and an A/D clock signal ADC for operating the A/D conversion circuit 94. The periodic signals for operating the CCD 49 and the AFE circuit 93 include a clock signal CLK, a reset signal RS and a clamp signal CLP.

The CCD 49 receives reflected light from a document, photoelectrically converts it and outputs an analog signal (first analog signal) A1 indicating light intensity by a voltage.

Figure 4:
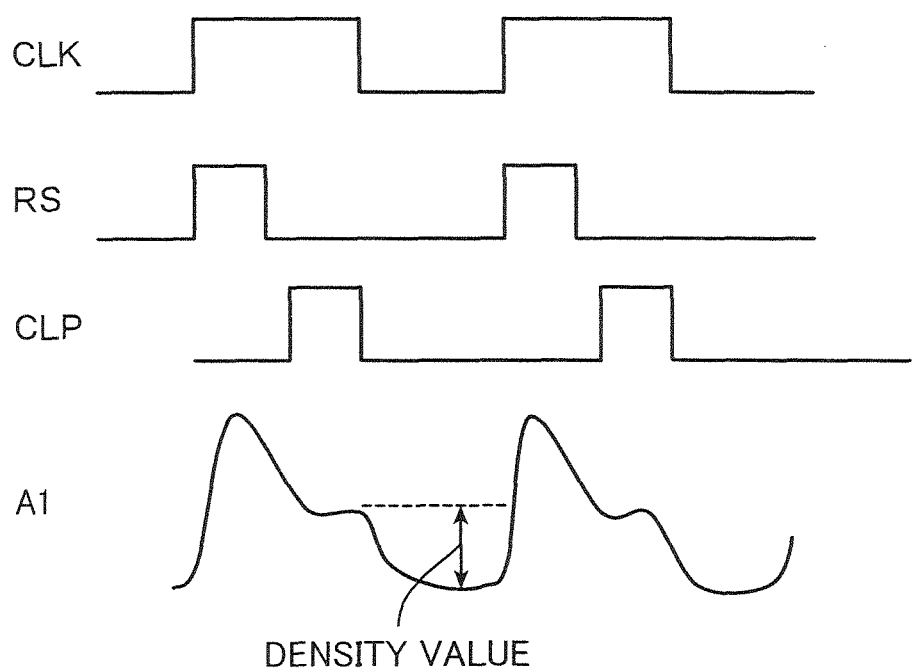
FIG. 4 is a signal waveform chart of signals relating to the operation of a CCD.

FIG. 4 is a signal waveform chart of signals relating to the operation of the CCD 49. As shown in FIG. 4, when the clock signal CLK and the reset signal RS input from the synchronization signal generation circuit 90 rise to high level, the CCD 49 starts discharging accumulated electric charges. In this way, a voltage level of the analog signal A1 output from the CCD 49 increases. Subsequently, when the reset signal RS falls to low level and the clamp signal CLP rises to high level, the voltage level of the analog signal A1 is maintained substantially at a constant clamp level.

When the clamp signal CLP falls to low level, the analog signal A1 is reduced. A difference between a lowest point of the analog signal A1 and the clamp level indicates the density of one pixel. Subsequently, when the clamp signal CLK and the reset signal RS rise to high level again, the CCD 49 starts discharging accumulated electric charges of the next pixel and repeats an operation similar to the above.

Referring back to FIG. 3, the voltage-dividing circuit 91 generates an analog signal (second analog signal) A2 by voltage-dividing the analog signal A1 output from the CCD 49 at a predetermined voltage-dividing ratio. The voltage-dividing circuit 91 is described in detail later.

The capacitor 92 generates an analog signal (fourth analog signal) A3 by cutting off a direct-current voltage component included in the analog signal A2 output from the voltage-dividing circuit 91.

The AFE circuit 43 samples/holds the analog signal A3 output from the capacitor 92 on a pixel-to-pixel basis in synchronization with various timing signals output from the synchronization signal generation circuit 90. The AFE circuit 93 generates an analog signal (third analog signal) A4 by amplifying the analog signal sampled/held on a pixel-to-pixel basis with a predetermined gain. Note that the gain is predetermined based on an experimental value of a test operation or the like so that the voltage of the analog signal A4 has an appropriate voltage value for the conversion of an analog signal into a digital signal in the A/D conversion circuit 94 in a subsequent stage.

The A/D conversion circuit 94 converts the analog signal A4 output from the AFE circuit 93 into a digital signal D1 on a pixel-to-pixel basis in synchronization with the A/D clock signal ADC output from the synchronization signal generation circuit 90.

The shading correction circuit 95 applies a shading correction to the image data represented by the digital signal D1 converted by the A/D conversion circuit 94 based on correction values such as an orientation characteristic of the light source 42 and a pixel-to-pixel sensitivity variation of the CCD 49 stored in advance in the storage unit 7. The shading correction circuit 95 outputs image data D2 after the shading correction to the control unit 6 and the image processing circuit 96.

The image processing circuit 96 performs image processings such as an MTF (Modulation Transfer Function) correction, edge enhancement, variable power and binarization to the image data D2 after the shading correction. The image processing circuit 96 outputs image data D3 after the image processings to the image forming unit 25.

Figure 5:
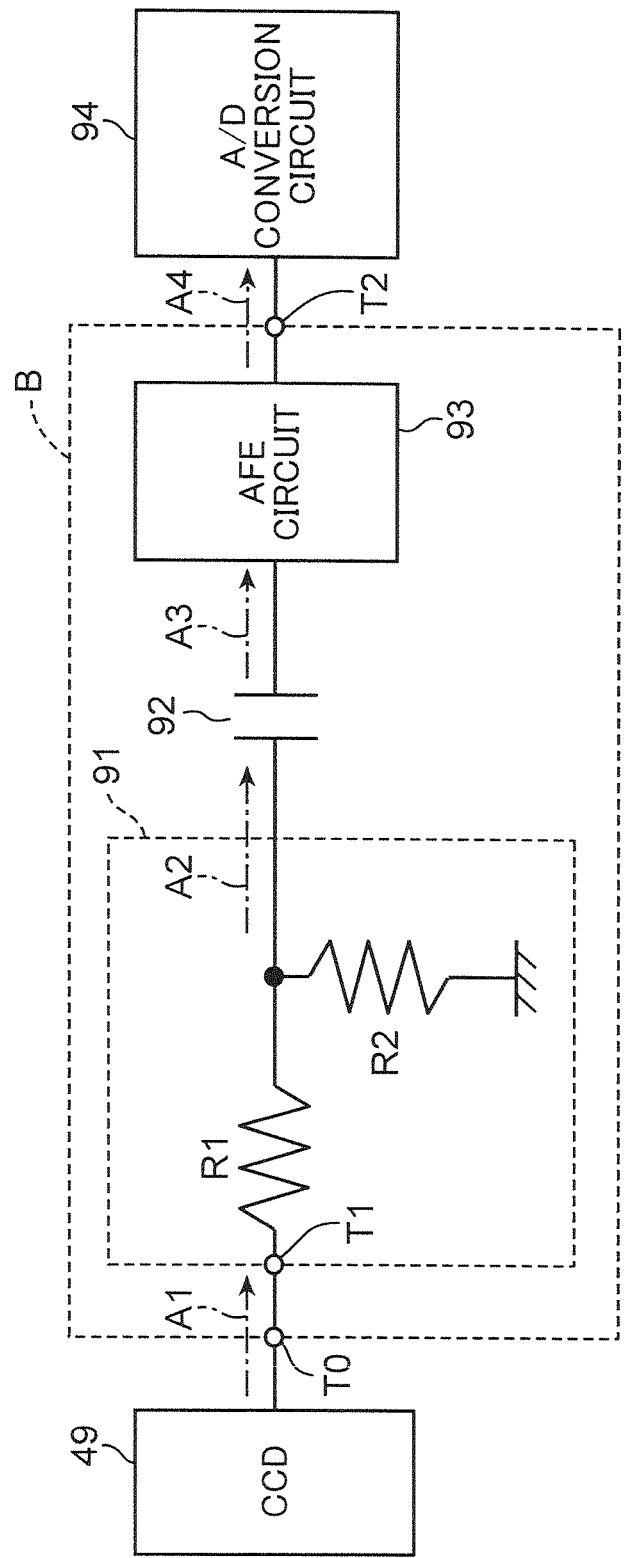
FIG. 5 is a schematic configuration diagram of a voltage-dividing circuit.

Next, the voltage-dividing circuit 91 is described in detail. FIG. 5 is a schematic configuration diagram of the voltage-dividing circuit 91. As shown in FIG. 5, the voltage-dividing circuit 91 is provided on the same board as a circuit board (board) B on which the capacitor 92 and the AFE circuit 93 are provided.

The voltage-dividing circuit 91 includes an input terminal (input portion) T1, a resistor (first resistor) R1 and a resistor (second resistor) R2. The analog signal A1 output from the CCD 49 is input to the input terminal T1. One end of the resistor R1 is connected to the input terminal T1. The other end of the resistor R1 is connected to one end of the resistor R2. The other end of the resistor R2 is grounded. Note that the voltage-dividing circuit 91 may include a wiring pattern connected to an input terminal T0 of the circuit board B as the input portion instead of the input terminal T1.

The voltage-dividing circuit 91 voltage-divides the analog signal A1 output from the CCD 49 at a predetermined voltage-dividing ratio DR determined by a resistance value r1 of the resistor R1 and a resistance value r2 of the resistor R2. The voltage-dividing circuit 91 outputs the voltage-divided analog signal A2 to the capacitor 92. Note that the voltage-dividing ratio DR is expressed by the following equation (1):

$$DR = r2/(r1+r2) \quad (1).$$

The voltage-dividing ratio DR is specifically predetermined to satisfy the following equation (2) using a maximum value AM1 of the amplitude of the analog signal A1 output from the CCD 49 and a maximum value AM2 of the amplitude of an analog signal inputtable to the AFE circuit 93.

$$DR \leq AM2/AM1 \quad (2).$$

The maximum value AM1 of the amplitude of the analog signal A1 output from the CCD 49 is, for example, a maximum value of an output voltage range determined in the specification of the CCD 49. The maximum value AM2 of the amplitude of the analog signal inputtable to the AFE circuit 93 is, for example, a maximum value of an input amplitude range determined in the specification of the AFE circuit 93.

That is, the voltage-dividing circuit 91 is configured to include the resistor R1 having the resistance value r1 and the resistor R2 having the resistance value r2, which values satisfy the following equation (3):

$$r2/(r1+r2) \leq Am2/AM1 \quad (3).$$

Figure 6A:
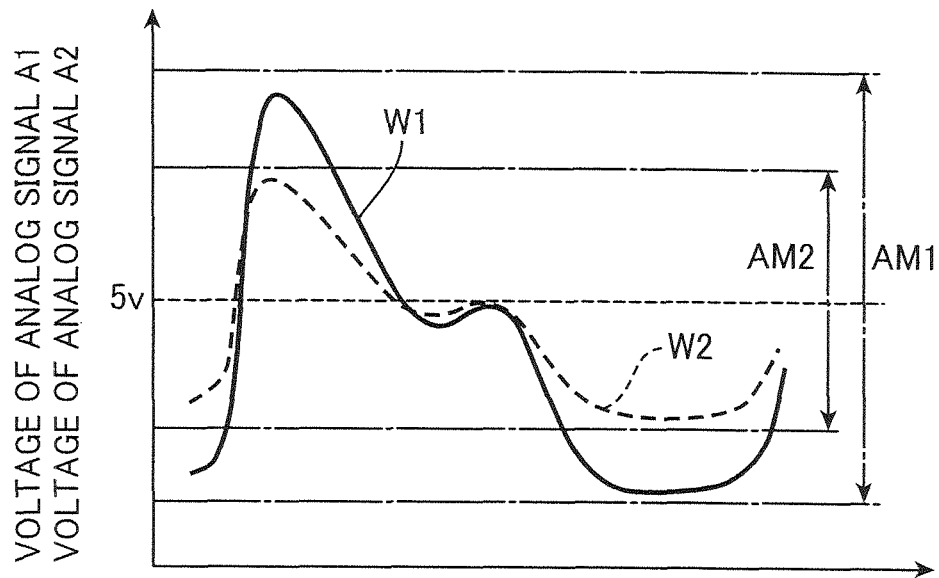
FIG. 6A is a graph showing a signal waveform of an analog signal output from the CCD and a signal waveform of an analog signal output from the voltage-dividing circuit and FIG. 6B is a graph showing signal waveforms of analog signals output from a capacitor.
Figure 6B:
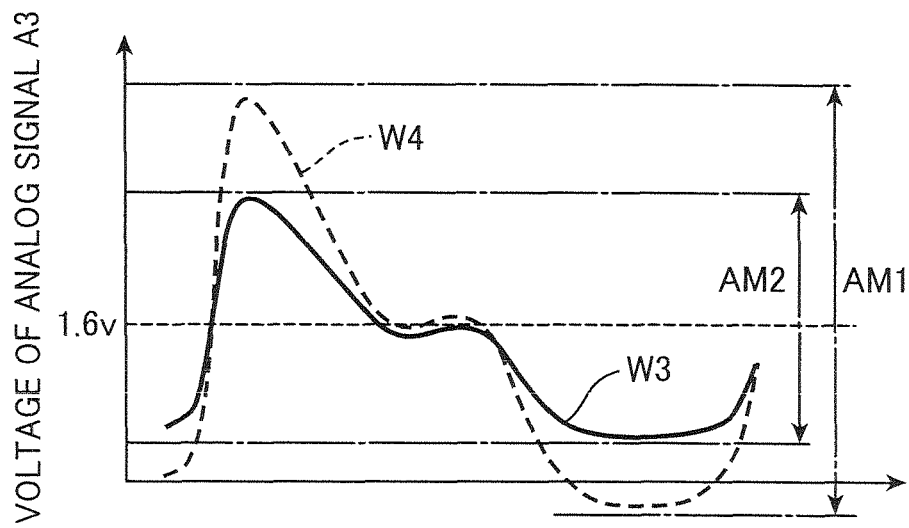
Figure 7:
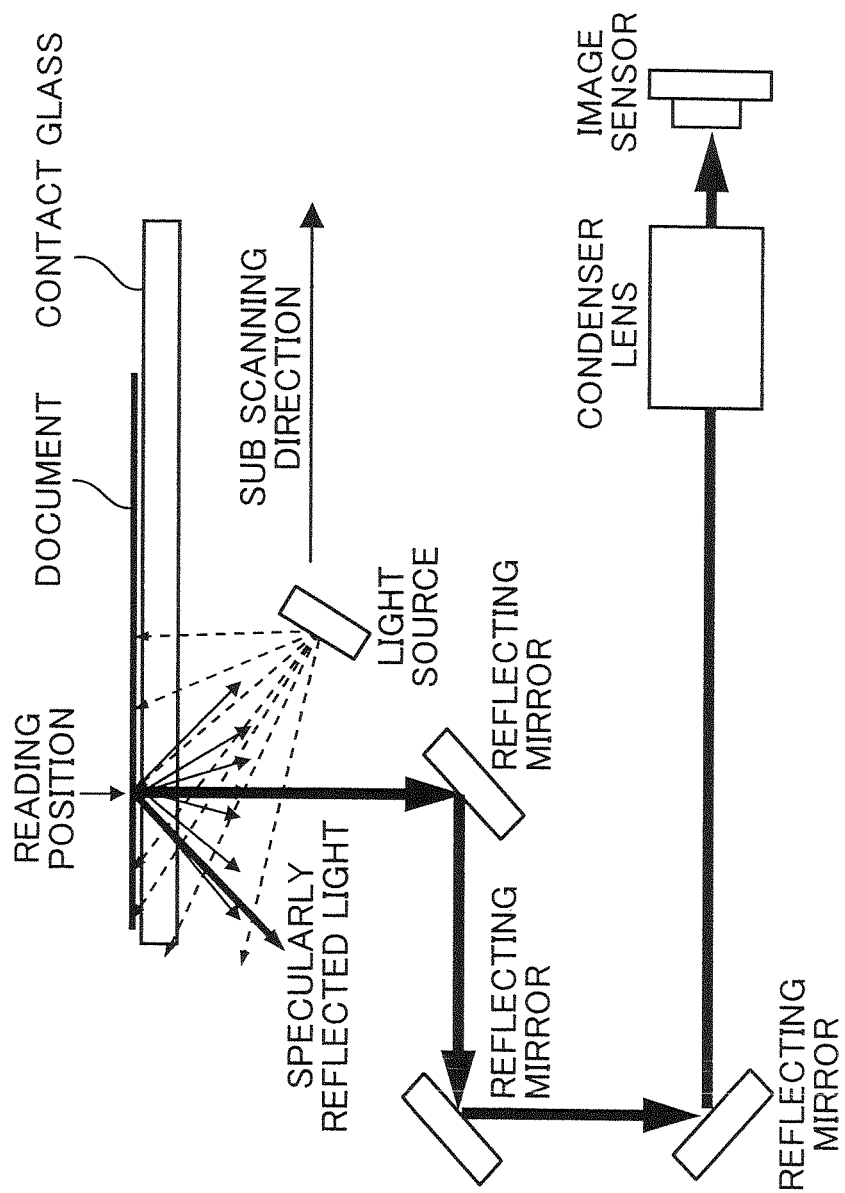
FIG. 7 is a diagram showing an example of a document reading operation.
Figure 8:
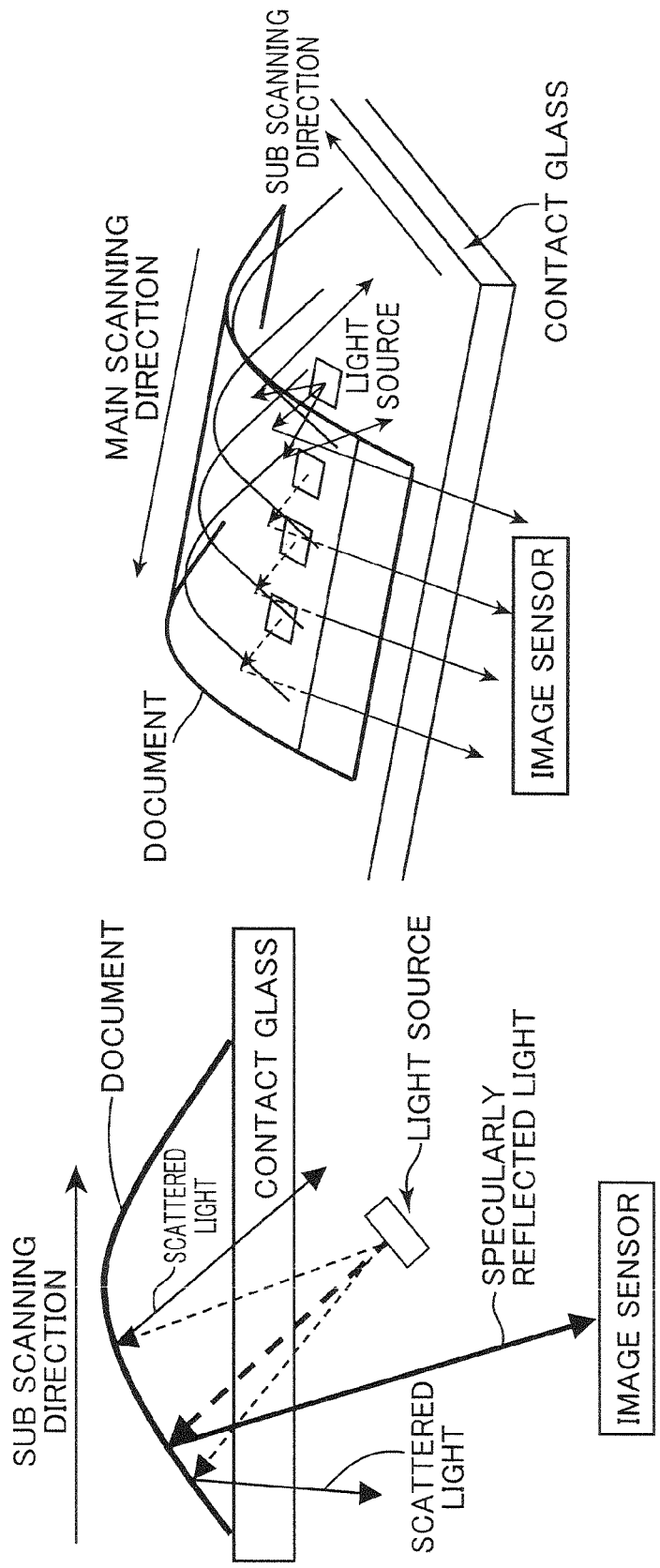
FIG. 8 is a diagram showing an example of a mode in which specularly reflected light is incident on an image sensor at the time of reading a document.

FIG. 6A is a graph showing a signal waveform W1 of the analog signal A1 output from the CCD 49 and a signal waveform W2 of the analog signal A2 output from the voltage-dividing circuit 91. FIG. 6B is a graph showing signal waveforms W3, W4 of the analog signals A3 output from the capacitor 92.

As shown in FIG. 6A, when the analog signal A1 represented by the signal waveform W1 is input, the voltage-dividing circuit 91 voltage-divides the analog signal A1 at the predetermined voltage-dividing ratio DR expressed by the above equation (1) and outputs the analog signal A2 represented by the signal waveform W2 to the capacitor 92. That is, the voltage-dividing circuit 91 voltage-divides the analog signal A1 so that the amplitude of the analog signal A2 represented by the signal waveform W2 does not exceed the maximum value AM2 of the amplitude of the analog signal inputtable to the AFE circuit 93. The capacitor 92 cuts off a direct-current voltage component of the input analog signal A2 and outputs the analog signal A3 represented by the signal waveform W3 to the AFE circuit 93 as shown in FIG. 6B. In this way, the analog signal A3 represented by the signal waveform W3 and having an amplitude not exceeding the maximum value AM2 of the amplitude of the analog signal inputtable to the AFE circuit 93 is input to the AFE circuit 93.

It is assumed that, contrary to this, the analog signal A1 output from the CCD 49 is input to the capacitor 92, for example, without providing the voltage-dividing circuit 91. In this case, as shown in FIG. 6B, the capacitor 92 cuts off the direct-current voltage component of the input analog signal A2 and outputs the analog signal A3 represented by the signal waveform W4 to the AFE circuit 93. That is, the analog signal A3 having an amplitude exceeding the maximum value AM2 of the amplitude of the analog signal inputtable to the AFE circuit 93 is input to the AFE circuit 93. This causes a possibility that the AFE circuit 93 erroneously operates.

To solve this problem, it is conceivable to provide a clamp circuit and a limiter circuit between the CCD 49 and the AFE circuit 93 by applying the technique proposed above. However, in the above technique, the clamp circuit is configured to include a switch, a reference voltage source, a transistor and a resistor. The limiter circuit is configured to include a reference voltage source, three diodes, a transistor, a resistor and a capacitor. That is, in the above technique, a circuit with a complicated configuration including many circuit elements has to be conceivably provided between the CCD 49 and the AFE circuit 93.

Thus, there has been conceivably a room for improvement in limiting the voltage level of the analog signal input to the AFE circuit 93 provided in the stage subsequent to the CCD 49 by a simplified and inexpensive configuration.

According to the above embodiment, the analog signal A2 obtained by voltage-dividing the analog signal A1 output from the CCD 49 at the predetermined voltage-dividing ratio DR is generated by the voltage-dividing circuit 91. This voltage-dividing ratio DR is not higher than a ratio of the maximum value AM2 of the amplitude of the analog signal inputtable to the AFE circuit 93 to the maximum value AM1 of the amplitude of the analog signal A1 having a possibility of being output from the CCD 49. Thus, the maximum value of the amplitude of the analog signal A2 output from the voltage-dividing circuit 91 is limited to or below the maximum value AM2 of the amplitude of the analog signal inputtable to the AFE circuit 93. This causes the maximum value of the amplitude of the analog signal A3 having the direct-current voltage component cut off by the capacitor 92 also to be limited to or below the maximum value AM2 of the amplitude of the analog signal inputtable to the AFE circuit 93.

That is, according to the above embodiment, the voltage level of the analog signal input to the AFE circuit 93 in the stage subsequent to the CCD 49 can be limited by the simplified and inexpensive configuration composed of two resistors R1, R2.

Further, according to the above embodiment, the voltage-dividing circuit 91, the capacitor 92 and the AFE circuit 93 are provided on the same circuit board B. Thus, the respective components 91 to 93 can be so arranged that a distance from the voltage-dividing circuit 91 to the AFE circuit 93 is relatively short as compared with the case where the voltage-dividing circuit 91, the capacitor 92 and the AFE circuit 93 are provided on different circuit boards. This enables noise to be superimposed on the analog signals A2 and A3 to be relatively reduced.

Note that the multifunctional peripheral 1 has been described as an example of the image forming apparatus according to the present disclosure in the above embodiment. The present disclosure is also applicable to copiers, scanners, facsimile machines and the like. Further, the configuration and the like shown in FIGS. 1 to 8 are merely an illustration of the embodiment according to the present disclosure and not intended to limit the present disclosure to the above embodiment.

For example, the voltage-dividing circuit 91 may be provided on a circuit board different from the capacitor 92 and the AFE circuit 93. Further, the configuration may be so simplified as not to include the capacitor 92.

According to the present disclosure described above, a voltage level of an analog signal to be input to an analog processor provided in a stage subsequent to an image sensor can be limited by a simplified and inexpensive configuration.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image reading apparatus, comprising:
a light source unit for irradiating light to a document;
an image sensor for receiving reflected light from the document irradiated with light by the light source unit and outputting a first analog signal representing the intensity of the reflected light by a voltage;
an attenuator including an input portion to which the first analog signal is input, a first resistor, one end of which is connected to the input portion and a second resistor, one end of which is connected to the other end of the first resistor and the other end of which is grounded and configured to generate a second analog signal by voltage-dividing the first analog signal at a predetermined voltage-dividing ratio by the first and second resistors;
an analog processor for generating a third analog signal by amplifying the second analog signal with a predetermined gain; and
an A/D converter for converting the third analog signal into a digital signal;
wherein the voltage-dividing ratio is not higher than a ratio of a maximum value of the amplitude of an analog signal inputtable to the analog processor to a maximum value of the amplitude of an analog signal having a possibility of being output from the image sensor.

2. An image reading apparatus according to claim 1, further comprising a capacitor for generating a fourth analog signal by cutting off a direct-current voltage component included in the second analog signal and outputting the fourth analog signal as the second analog signal to the analog processor.

3. An image reading apparatus according to claim 1, further comprising one or more boards; wherein:
the attenuator and the analog processor are provided on the same board.

4. An image forming apparatus, comprising:
a light source unit for irradiating light to a document;
an image sensor for receiving reflected light from the document irradiated with light by the light source unit and outputting a first analog signal representing the intensity of the reflected light by a voltage;
an attenuator including an input portion to which the first analog signal is input, a first resistor, one end of which is connected to the input portion and a second resistor, one end of which is connected to the other end of the first resistor and the other end of which is grounded and configured to generate a second analog signal by voltage-dividing the first analog signal at a predetermined voltage-dividing ratio by the first and second resistors;
an analog processor for generating a third analog signal by amplifying the second analog signal with a predetermined gain;
an A/D converter for converting the third analog signal into a digital signal; and
an image forming unit for forming an image using the digital signal output from the A/D converter;
wherein the voltage-dividing ratio is not higher than a ratio of a maximum value of the amplitude of an analog signal inputtable to the analog processor to a maximum value of the amplitude of an analog signal having a possibility of being output from the image sensor.

5. An image forming apparatus according to claim 4, further comprising a capacitor for generating a fourth analog signal by cutting off a direct-current voltage component included in the second analog signal and outputting the fourth analog signal as the second analog signal to the analog processor.

6. An image forming apparatus according to claim 4, further comprising one or more boards; wherein:
the attenuator and the analog processor are provided on the same board.

* * * * *